(12) United States Patent
Morales et al.

(10) Patent No.: US 12,171,214 B2
(45) Date of Patent: Dec. 24, 2024

(54) BAIT STATION WITH BAIT SUPPORT WALL

(71) Applicants: Christopher H. Morales, La Crescenta, CA (US); James J. Doll, Bayside, WI (US); Donald Howard Franklin, Jr., Kingwood, TX (US); Brannon A. Coulter, Hubertus, WI (US)

(72) Inventors: Christopher H. Morales, La Crescenta, CA (US); James J. Doll, Bayside, WI (US); Donald Howard Franklin, Jr., Kingwood, TX (US); Brannon A. Coulter, Hubertus, WI (US)

(73) Assignee: LIPHATECH, INC., Milwaukee, WI (US)

( * ) Notice: Subject to any disclaimer, the term of this patent is extended or adjusted under 35 U.S.C. 154(b) by 491 days.

(21) Appl. No.: 17/200,653

(22) Filed: Mar. 12, 2021

(65) Prior Publication Data

US 2022/0287292 A1    Sep. 15, 2022

(51) Int. Cl.
*A01M 25/00*    (2006.01)

(52) U.S. Cl.
CPC ....... *A01M 25/004* (2013.01); *A01M 2200/00* (2013.01)

(58) Field of Classification Search
CPC ... A01M 25/004; A01M 25/002; A01M 25/00
USPC ........................................................ 43/131
See application file for complete search history.

(56) References Cited

U.S. PATENT DOCUMENTS

| 2,600,755 | A |   | 6/1952  | Greensfelder |
| 3,368,857 | A | * | 2/1968  | Harding ................. A47B 63/00 |
|           |   |   |         | 312/9.47 |
| RE28,586  | E |   | 10/1975 | Dahlquist |
| 4,848,217 | A | * | 7/1989  | Koziol ................. A47J 37/0694 |
|           |   |   |         | 99/426 |
| D308,317  | S |   | 6/1990  | Koziol |
| 5,806,237 | A | * | 9/1998  | Nelson ................ A01M 25/004 |
|           |   |   |         | 43/131 |

(Continued)

FOREIGN PATENT DOCUMENTS

CN    203040518 U    7/2013
KR    1020190029201 A    3/2019

*Primary Examiner* — Darren W Ark
*Assistant Examiner* — Kevin M Dennis
(74) *Attorney, Agent, or Firm* — Reinhart Boerner Van Deuren P.C.

(57) ABSTRACT

A bait rack including a mounting leg and a bait support portion is provided. The mounting leg has a bottom free edge and at least one mounting slot formed therein. The bait support portion includes an intermediate portion, an upward extending portion and a trough portion. The intermediate portion is connected to the mounting leg by a bent region formed between the mounting leg and the intermediate portion. The intermediate portion extends relative to the mounting leg in a non-parallel and non-perpendicular manner. The trough portion connects and is interposed between the upward extending portion and the intermediate portion. The intermediate portion, trough portion and upward extending panel portion forming a bait holding trough therebetween. A plurality of slots provide access to the bait holding trough from a location external of the bait holding trough. A bait station including the bait rack is also provided.

21 Claims, 9 Drawing Sheets

(56) References Cited

U.S. PATENT DOCUMENTS

| | | | | |
|---|---|---|---|---|
| 6,082,042 | A * | 7/2000 | Issitt | A01M 25/004 |
| | | | | 229/116 |
| 6,666,342 | B1 * | 12/2003 | House | B25H 3/06 |
| | | | | 248/214 |
| 6,671,999 | B1 * | 1/2004 | Doucette | A01M 1/2011 |
| | | | | 43/131 |
| 7,980,023 | B2 * | 7/2011 | Nelson | A01M 23/30 |
| | | | | 43/67 |
| 8,302,345 | B2 * | 11/2012 | Nelson | A01M 25/004 |
| | | | | 43/67 |
| 8,505,234 | B2 * | 8/2013 | Nelson | A01M 25/004 |
| | | | | 43/67 |
| 8,793,929 | B1 * | 8/2014 | Walsh | A01M 25/004 |
| | | | | 43/131 |
| 9,538,741 | B1 * | 1/2017 | Walsh | F16M 11/10 |
| 9,629,353 | B2 * | 4/2017 | Morales | A01M 25/004 |
| 9,743,658 | B1 * | 8/2017 | Walsh | F16M 11/10 |
| 10,362,777 | B1 * | 7/2019 | Walsh | A01M 23/00 |
| 10,897,887 | B1 * | 1/2021 | Walsh | A01M 31/002 |
| 11,006,623 | B1 * | 5/2021 | Walsh | A01M 23/00 |
| 2009/0229170 | A1 | 9/2009 | Gaibotti | |
| 2010/0319238 | A1 * | 12/2010 | Cink | A01M 25/004 |
| | | | | 43/58 |
| 2011/0239526 | A1 * | 10/2011 | Nelson | A01M 31/002 |
| | | | | 43/58 |
| 2013/0212927 | A1 * | 8/2013 | Heath | A01M 1/2016 |
| | | | | 43/132.1 |
| 2016/0066558 | A1 * | 3/2016 | Morales | A01M 25/002 |
| | | | | 43/131 |
| 2021/0015090 | A1 * | 1/2021 | Galloway | A01M 25/002 |

\* cited by examiner

BAIT STATION WITH BAIT SUPPORT WALL

FIELD OF THE INVENTION

The present invention relates generally to pest control products and, more particularly to a rodent bait station.

BACKGROUND OF THE INVENTION

Bait including toxins, poison, etc., may be used to attract rodents. Rodents ingest the bait and are killed by the toxins, poison, etc., in the bait. To prevent non-targeted animals, e.g., pets, etc., and unauthorized individuals, e.g., children, from coming into contact with or accidentally ingesting the bait, the bait may be located in a housing of a rodent bait station. The housing may include an opening configured to allow rodents access to the interior of the bait station to access the bait.

The bait station can be generally described as a housing that encloses an interior space which contains the bait. The housing has one or more entry points that allow the pest to enter the device and ingest the bait. Once ingested, the pest typically leaves the bait station and dies some time thereafter.

The housings typically include provisions for holding the bait in place. For example, preformed blocks of rodenticide or soft bait rodenticide, etc. may be situated on rods or the like within the interior space of the housing. This keeps the bait readily accessible to the pest. Such bait stations may come in a variety of sizes, have a variety of cosmetic designs, and allow for the use of multiple pieces of bait at once.

Some known bait stations include U.S. Pat. No. 9,629,353 and U.S. Publ. No. 2021/0015090. While these designs are highly functional, the present disclosure provides improvements over the current state of the art.

BRIEF SUMMARY OF THE INVENTION

Examples of the present disclosure provide new and improved bait stations and bait racks for used in bait stations.

In an example, a bait rack including a mounting leg and a bait support portion is provided. The mounting leg has a bottom free edge and at least one mounting slot formed therein. The bait support portion includes an intermediate portion, an upward extending portion and a trough portion. The intermediate portion is connected to the mounting leg by a bent region formed between the mounting leg and the intermediate portion. The intermediate portion extends relative to the mounting leg in a non-parallel and non-perpendicular manner. The trough portion connects and is interposed between the upward extending portion and the intermediate portion. The intermediate portion, trough portion and upward extending panel portion forming a bait holding trough therebetween. A plurality of slots provide access to the bait holding trough from a location external of the bait holding trough. Typically, this is vertically below the bait rack.

In one example, each slot of the plurality of slots has a first end located within the upward extending portion and a second end located within the intermediate portion. Each slot extends between the first and second ends through the trough portion.

In one example, the mounting leg, intermediate portion, upward extending portion and trough portion are formed from a one-piece, continuous piece of sheet material. This sheet material could be plastic or metal. Typically, the sheet material will be stamped (e.g. bent) sheet metal.

In one example, the mounting slot extends from the bottom free edge towards the bent region.

In one example, the mounting leg is a generally planar portion, the intermediate portion is a generally planar portion and the upward extending portion is a generally planar portion.

In one example, the trough portion is generally curved and a first radius of curvature of the bent region is smaller than a second radius of curvature of the trough portion.

In one example, the at least one mounting slot includes a pair of parallel and laterally spaced apart mounting slots. Each mounting slot extends from the bottom free edge and intersects the bottom free edge.

In one example, the first ends of the plurality of slots are all located a same distance from an upper free edge of the upward extending portion and the second ends of the plurality of slots are all located a same second distance from the bent region.

In one example, the upward extending portion is generally parallel to the mounting leg.

In one example, the one-piece, continuous piece of sheet material is free of welds, and all portions are formed from a single piece of continuous material.

In an example, a bait station for containing bait includes a housing and a bait holding rack as outlined above. The housing has a housing lid and a housing body. The housing lid and housing body enclose an interior space and define at least one opening permitting access to the interior space. The housing body has a support wall defining at least a side of the interior space and extending upward from a floor of the housing body. A first mounting rib extends outward from the support wall, but within the interior space. The bait holding rack is positioned within a bait chamber of the interior space with the mounting rib extending into the mounting slot in the mounting leg.

In one example, the housing body includes opposed first and second side walls extending outward from the support wall. The housing body includes aligned first and second front walls. The first front wall extending from the first sidewall towards the second sidewall and the second front wall extending from the second sidewall towards the first sidewall. The first and second front walls defining an opening permitting access to the bait chamber. The bait chamber is generally defined by the support wall, the first and second side walls and the first and second front walls.

In one example, the bait chamber has a bait chamber height defined between the floor and a top of the support wall. A clearance is formed between a bottom side of the trough portion and the floor. A clearance height of the clearance between the floor and the bottom side of the trough portion is no less than one-third the bait chamber height.

In one example, the clearance heights at least one-half the bait chamber height.

In one example, the housing lid is pivotally connected to the housing body proximate the support wall. The housing lid covers the trough formed between the upward extending portion and the intermediate portion.

In one example, a bait loading post extends through one of the plurality of slots. The bait loading post has a free end axially received in a mounting cavity provided by the floor of the housing body. The free end may be friction fit within the mounting cavity to prevent removal thereof. The cavity may be formed by a nub extending upward from the floor of the housing body.

In one example, the bait holding rack rests vertically on a top of the mounting rib.

In one example, the first mounting rib has a leg portion and a foot portion extending from the leg portion. The leg portion extends between the foot portion and the support wall. The foot portion is spaced away from the support wall thereby defining a receiving cavity therebetween. A portion of the mounting leg is received in the receiving cavity and is positioned between the foot portion and the support wall.

In one example, the at least one mounting slot includes first and second laterally spaced apart mounting slots. Each mounting slot extends from the bottom free edge and intersects the bottom free edge. A second mounting rib is laterally spaced apart from the first mounting rib. The second mounting rib has a leg portion and a foot portion. The leg portion extends between the foot portion and the support wall. The foot portion is spaced away from the support wall thereby defining a second receiving cavity therebetween. The second mounting rib extends into the second mounting slot. A second portion of the mounting leg is received in the second receiving cavity.

In one example, the bait holding rack hangs from the support wall and first mounting rib.

In one example, the free edge of the mounting leg is spaced a first distance from the floor, the first distance being smaller than the clearance height.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to the figures generally, an embodiment of a bait station 20 is provided. Various different types of bait, e.g., bait blocks, soft bait, etc., may be placed in and used with the bait station. Soft bait may be provided in wrappers, e.g., sachets, paper sachets, etc. When rodents consume the bait, portions of the wrappers may be left behind and/or may become located outside of the bait station, which may be undesirable, e.g., be visually displeasing, potentially have portions of bait stuck to scraps of wrapper located outside the bait station, etc. Therefore, an embodiment of a bait rack 36 is provided to support the bait in the housing 22. The bait rack 36 is configured to allow bait, e.g., soft bait, to be placed directly on the rack without a wrapper. Additionally, the bait rack 36 allows rodents to access the bait located on the bait rack from below, but not to remove all of the bait from the bait rack 36 at once. Moreover, the bait rack 36 allows bait to be dropped into the bait compartment of the bait rack without the need to further manipulate the bait to secure it within the bait station, e.g., without need to secure bait, e.g., to bait rods, etc.

Figure 1:
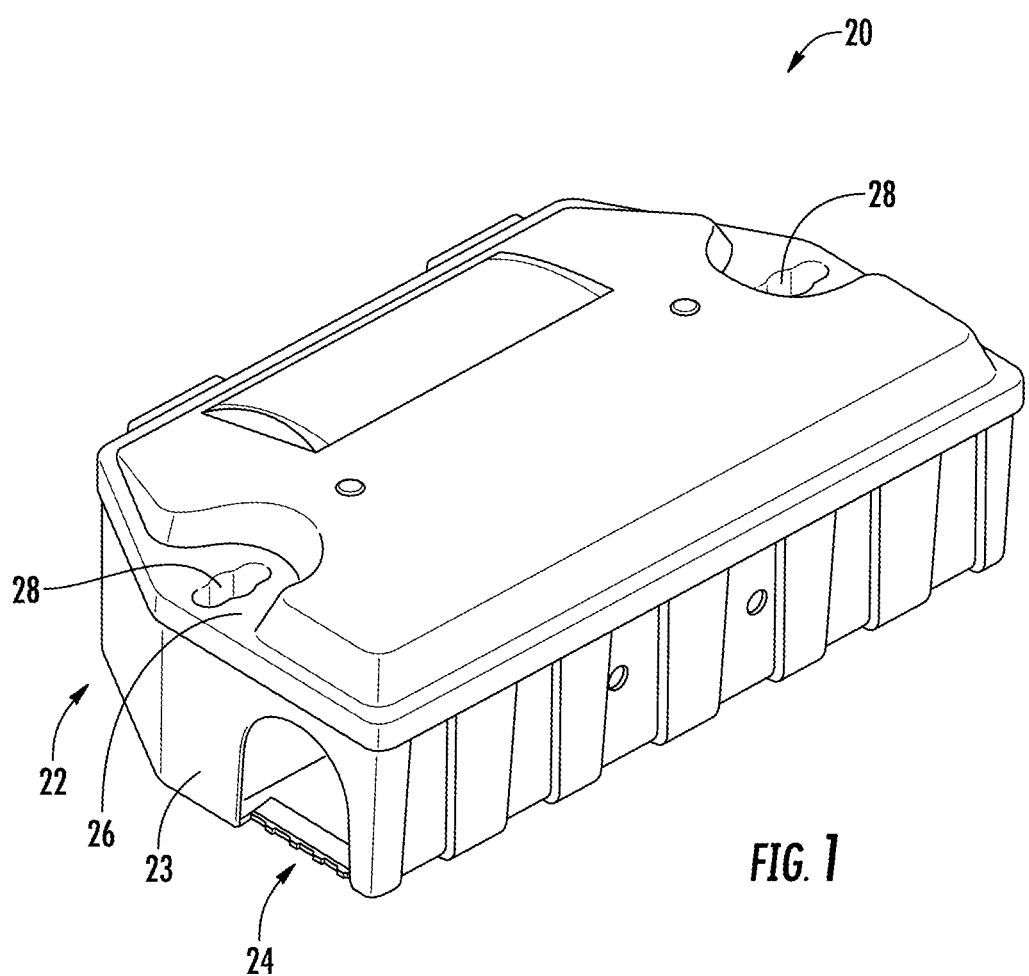
FIG. 1 is a perspective illustration of a bait station according to an example of the disclosure with a housing lid in a closed orientation.

With reference to FIG. 1, an embodiment of a bait station 20 is illustrated. The bait station 20 includes a housing 22 having a housing body 23 and a housing lid 26 inside which bait will be located. The housing body 23 includes an opening 24 through which rodents may gain access to the bait inside of the housing 22.

The housing lid 26 is pivotably attached to the housing body 23. A user may pivot the housing lid 26 between an open configuration (FIG. 2) and a closed configuration (FIG. 1). In the open configuration, the user can load bait inside the housing 22.

The lid 26 includes keyholes 28 through which a locking mechanism may be actuated by a key to lock the lid 26 in the closed configuration, e.g., after bait has been loaded into the bait station 20, and to unlock the lid 26 to allow it to be pivoted to an open configuration to allow loading of bait into the bait station 20.

In this example, the bait station 20 also includes a bottom anchoring portion, shown as concrete base 30, configured to anchor the housing 22 to prevent movement of the housing 22, e.g., by rodents, wind, etc. However, other examples need not include the concrete base 30.

Figure 2:
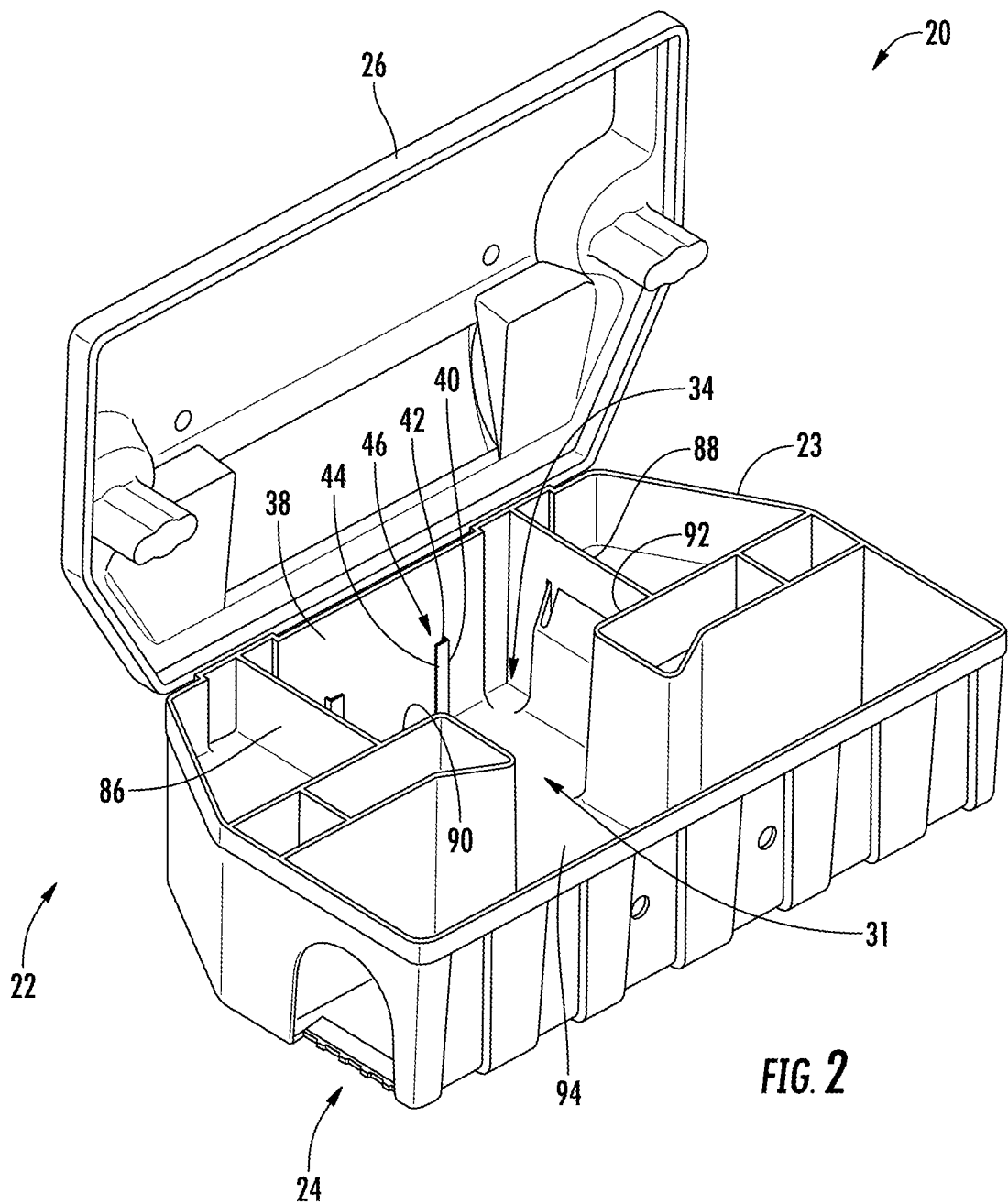
FIG. 2 is a perspective illustration of the housing of the bait station of FIG. 1 with the housing lid in an open orientation.

FIG. 2 illustrates the bait station 20 with the lid 26 in an open configuration. The opening 24 in the housing 22 provides access to an interior space 31 defined by the housing 22 and lid 26. A passage 32 leads to a bait chamber 34. In one example, the housing body 23 also includes an opening at the opposite side of the passage 32 from the opening 24.

Figure 3:
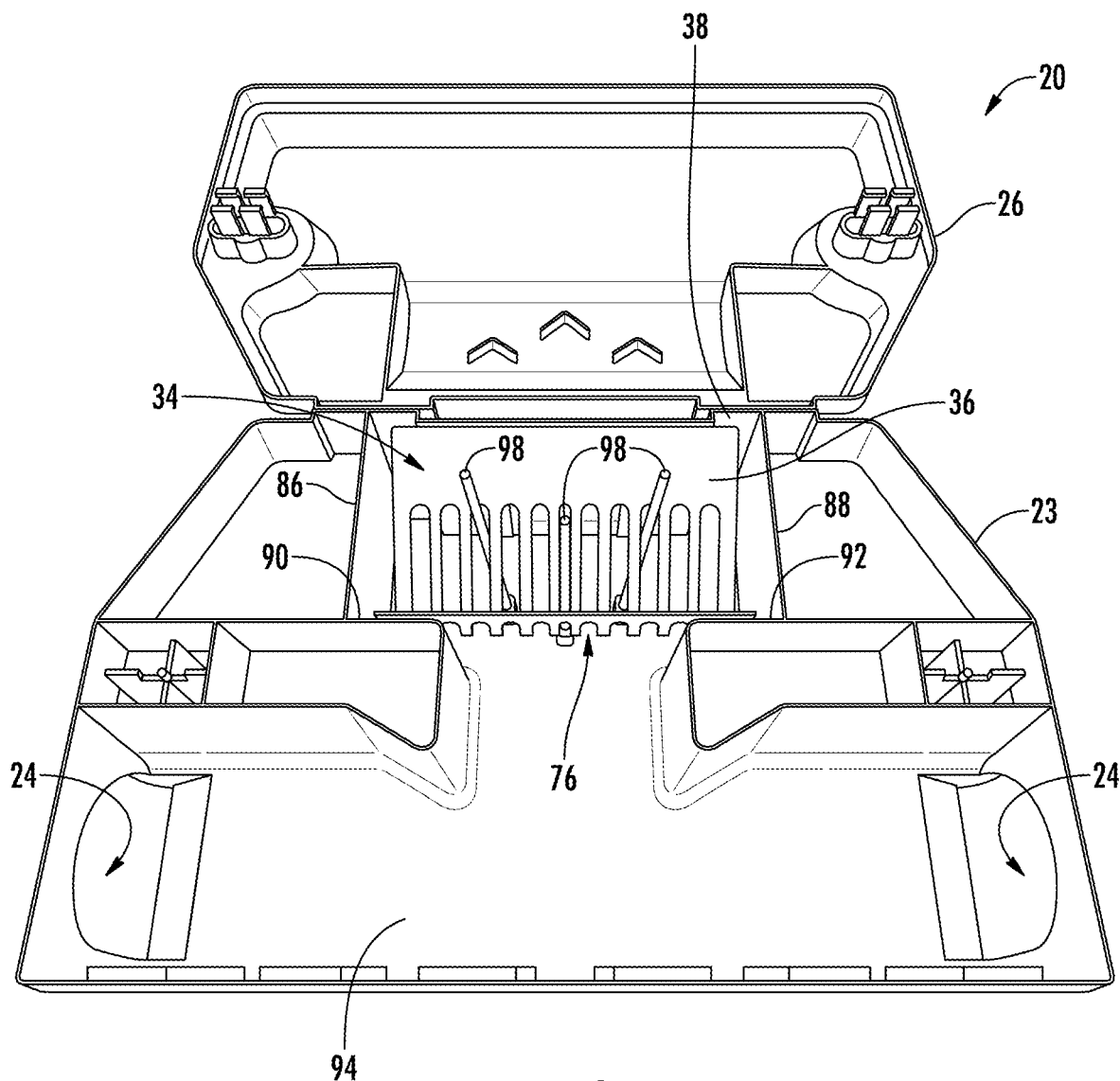
FIG. 3 is a perspective illustration of the housing of the bait station of FIG. 1 with the housing lid in an open orientation with a bait rack mounted therein.
Figure 4:
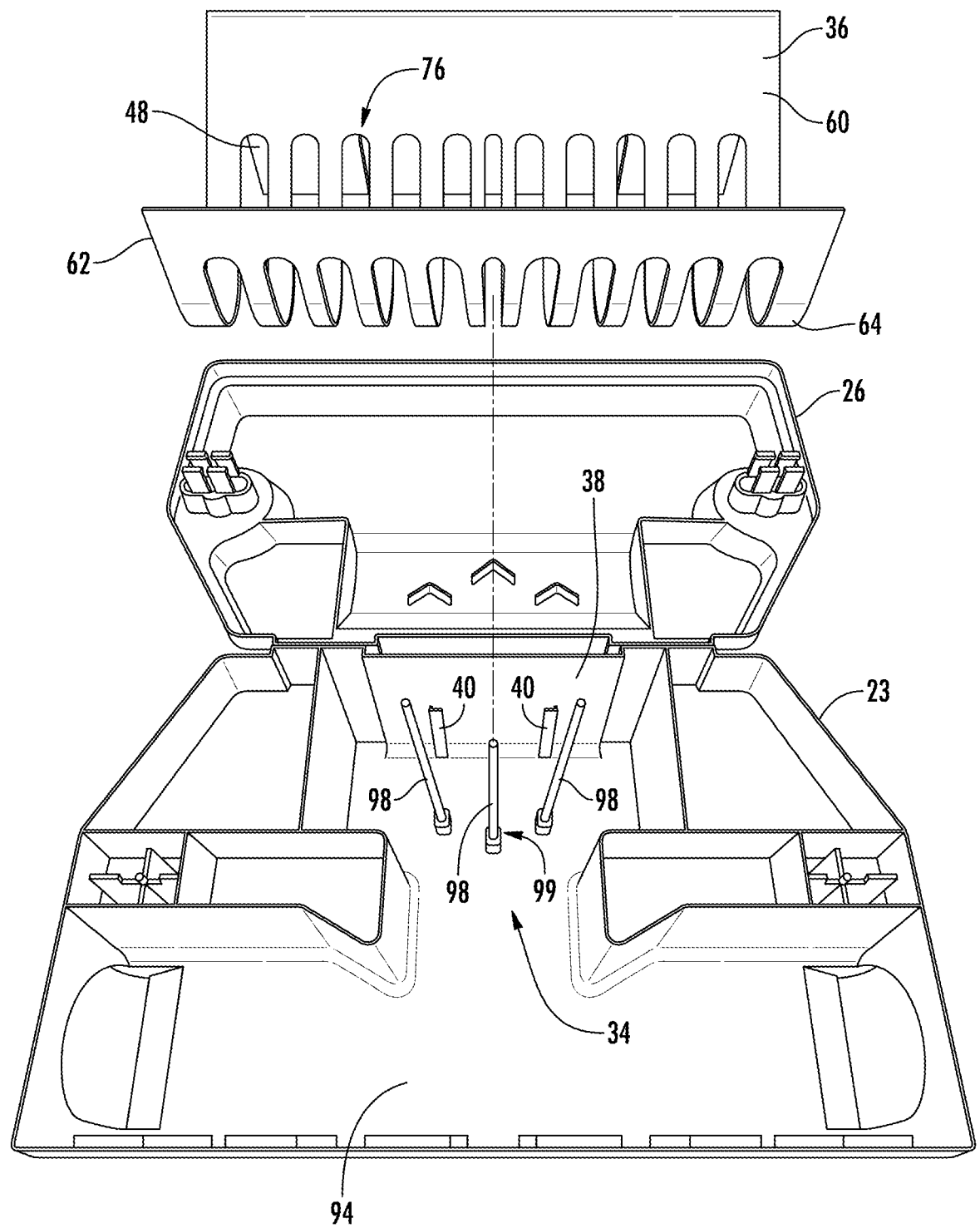
FIG. 4 is a perspective illustration of the housing of the bait station of FIG. 1 with the housing lid in an open orientation with a bait rack removed therefrom

With reference to FIG. 3, a bait rack 36 may be located in the bait chamber 34 to secure bait within the housing 22 while allowing rodents to consume the bait.

The bait rack 36 is mounted to a support wall 38 of the housing body 23 that defines, at least in part, the interior space 31 and particularly bait chamber 34. The support wall 38 includes a pair of mounting ribs 40 that cooperate with the bait rack 36 to mount the bait rack 36 within the bait chamber 34.

With reference to FIG. 2, in this example, the each mounting rib 40 includes a leg portion 42 that extend from the support wall 38 and a foot portion 44 that extends from the leg portion 42. The leg portion 42 extends between and spaces the foot portion 44 from the support wall 38 forming a receiving cavity 45 therebetween.

Portions of the bait rack 36 are received in the receiving cavities 45 to secure the bait rack 36 to the support wall 38.

Figure 5:
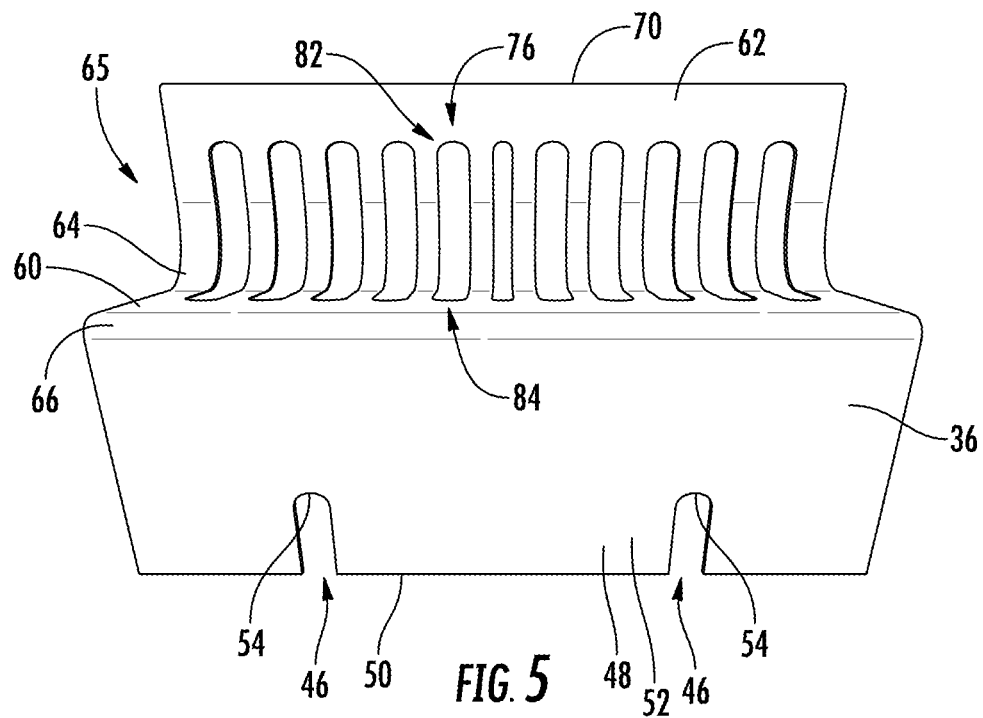
FIG. 5 is a perspective rear view of a bait rack for use with the bait station.

FIG. 5 illustrates the bait rack 36 removed from the housing 22. The bait rack 36 includes mounting slots 46 that receive and otherwise cooperate with mounting ribs 40.

The mounting slots are formed in a mounting leg 48 of the bait rack 36. The mounting slots 46 extend upward from a free edge 50 of the mounting leg 48. In other embodiments, it is contemplated that mounting slots 46 could be offset from free edge 50 and not intersecting with free edge 50.

The mounting slots 46 are generally parallel to one another and laterally spaced apart.

In this example, the region 52 of the mounting leg 48 located between the mounting slots 46 is positioned laterally between the mounting ribs 40 when the bait rack 36 is mounted.

In this example and with reference to FIG. 2, the foot portions 44 extend towards one another. Thus, the foot portions 44 extend over corresponding portions of region 52 of the mounting leg 48 that are received in receiving cavities 45. Thus, the thickness of the mounting leg 48, and particularly the portions that are received in receiving cavities 45 has a thickness substantially equal to or smaller than the gap between the foot portions 44 and the support wall 38.

The cooperation of the foot portions 44 and region 52 can prevent tilting or tipping of the bait rack 36 when mounted within the bait chamber 34.

Other examples could be free of the foot portions 44 or could have the foot portions extend away from one another.

The top ends 57 of the mounting ribs 40 are spaced a distance D1 away from the top edge of the support wall 38. The inward ends 54 of the slots 46 rest, in some examples, on the top ends 57 of the mounting ribs.

Figure 6:
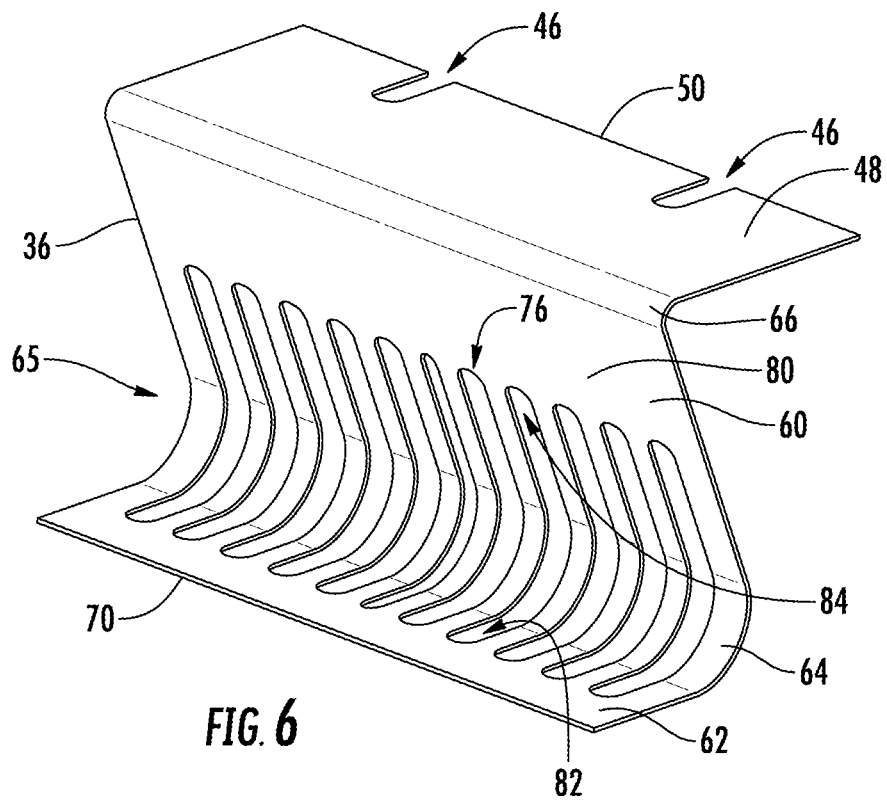
FIG. 6 is a perspective top and side view of the bait rack of FIG. 5.
Figure 7:
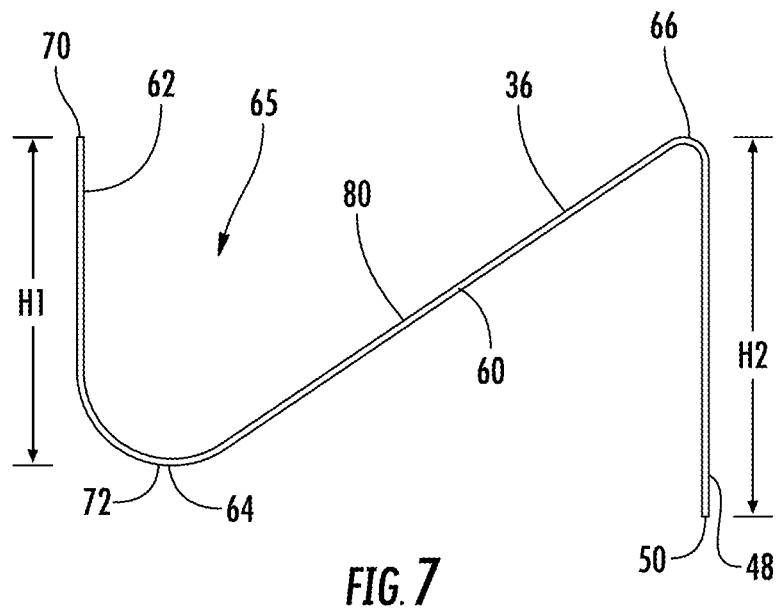
FIG. 7 is a side view of the bait rack of FIG. 6, which is substantially the same when viewed from the opposite side.
Figure 8:
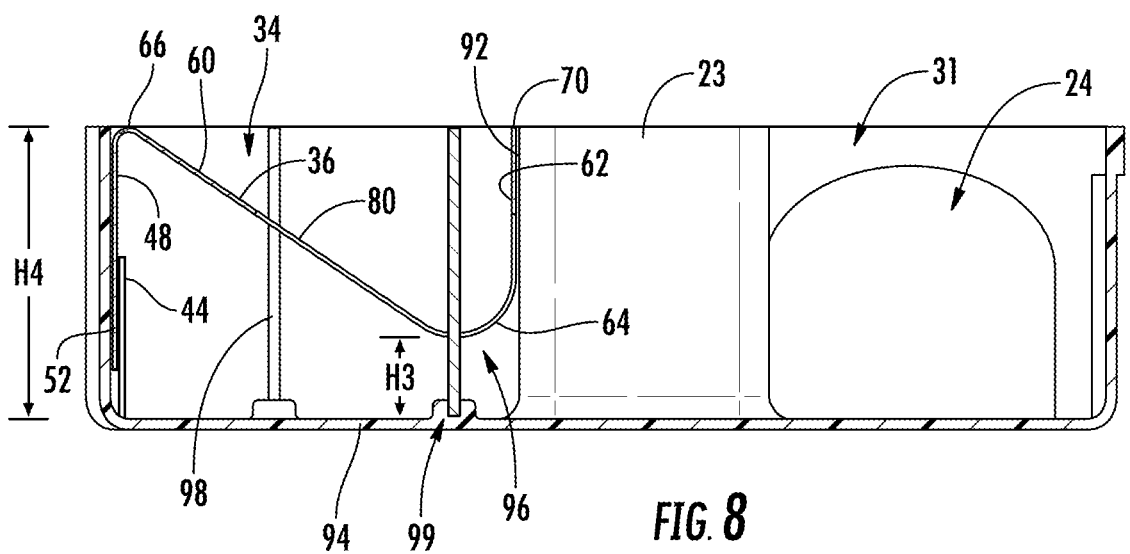
FIG. 8 is a cross-sectional illustration of the bait station of FIG. 3.
Figure 9:
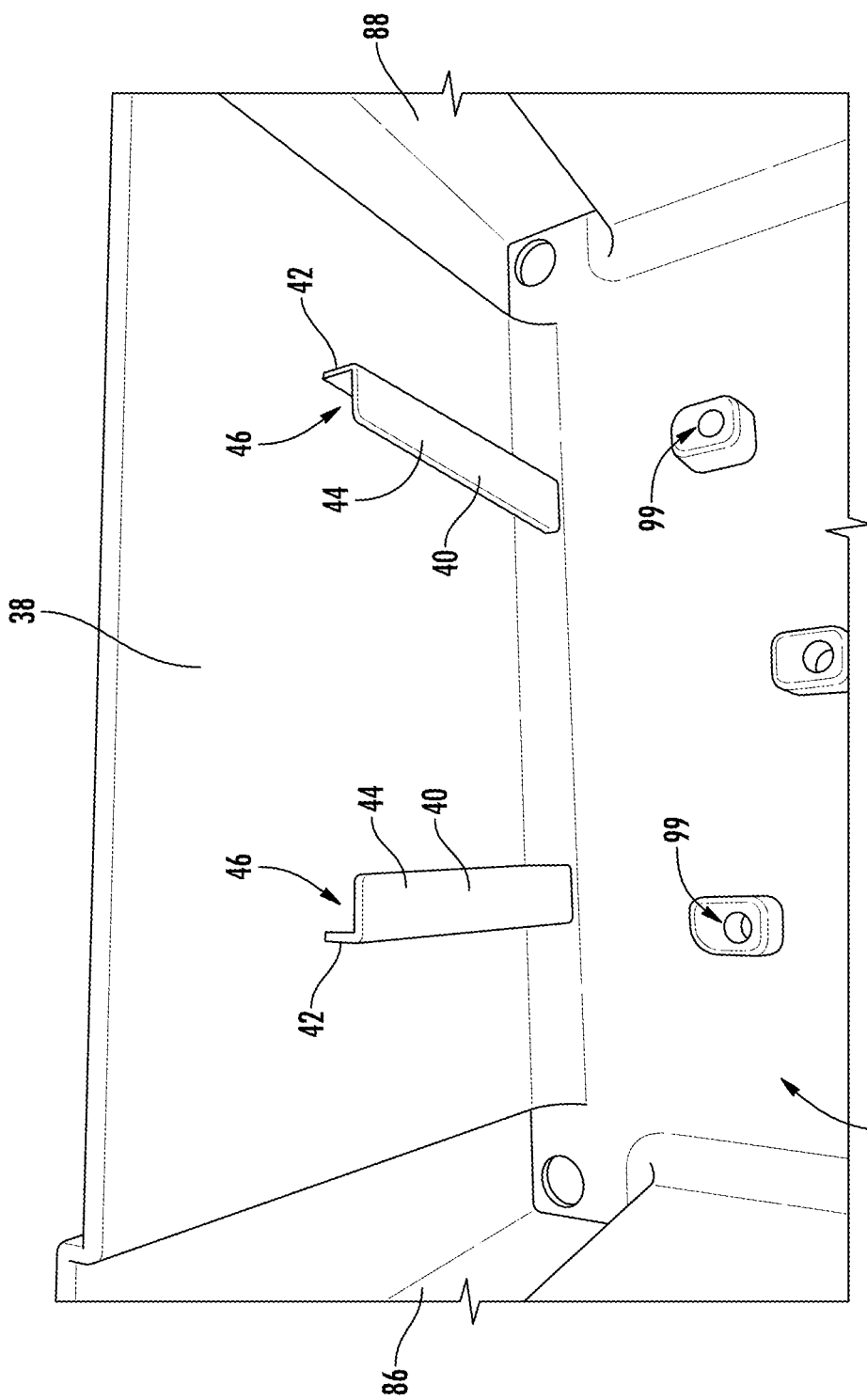
FIG. 9 is an enlarged perspective illustration of the mounting ribs formed as part of the support wall of the housing of the bait station of FIG. 1.
Figure 10:
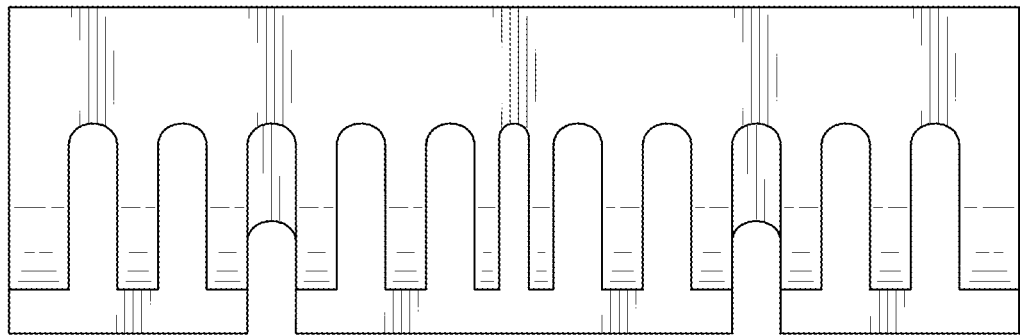
FIG. 10 is a front view of the bait rack of FIG. 6.
Figure 11:
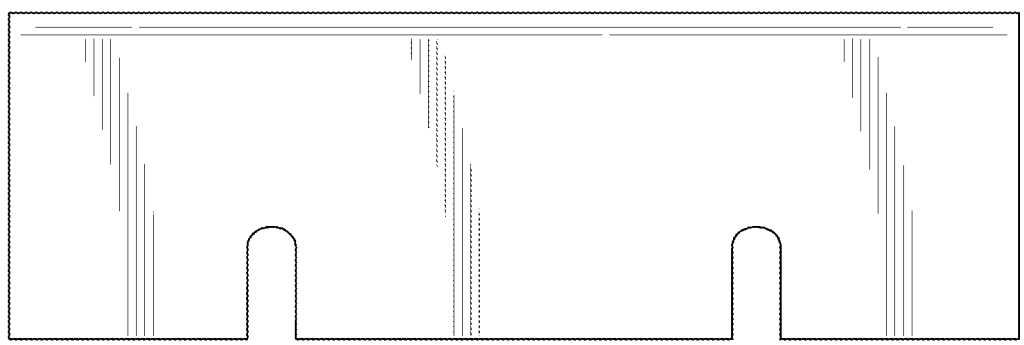
FIG. 11 is a rear view of the bait rack of FIG. 6.
Figure 12:
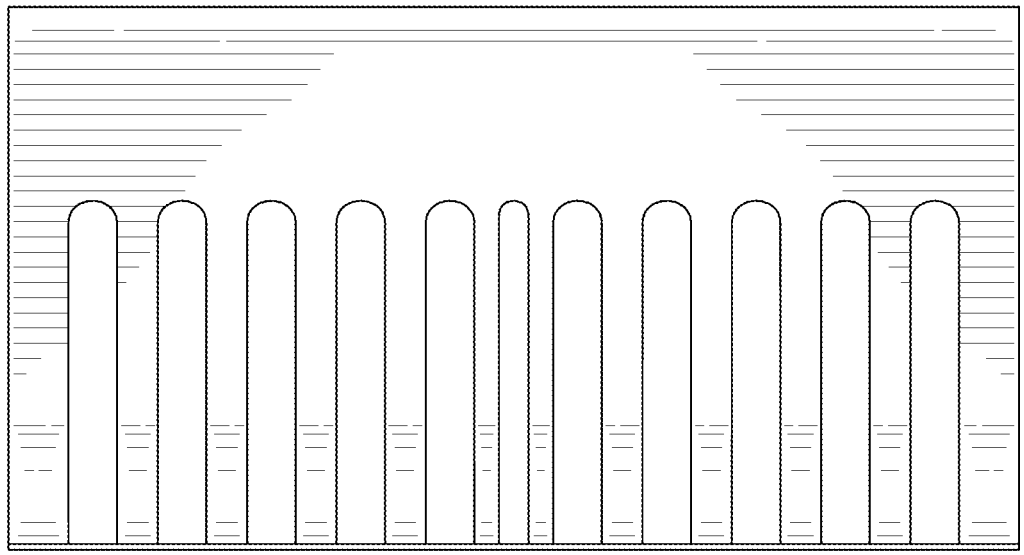
FIG. 12 is a top view of the bait rack of FIG. 6.
Figure 13:
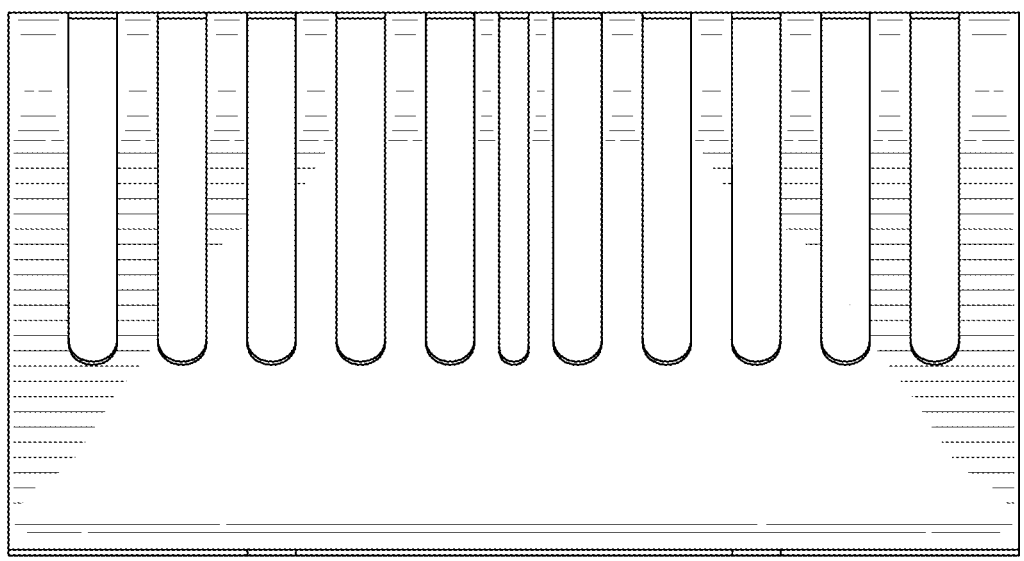
FIG. 13 is a bottom view of the bait rack of FIG. 6.

With reference to FIGS. 6 and 7, in addition to mounting leg 48, the bait rack 36 includes an intermediate portion 60, an upward extending portion 62, and a trough portion 64 therebetween.

In an example, mounting leg 48 is connected to the intermediate portion 60 by a bend 66. The intermediate portion extends at a non-parallel, non-perpendicular orientation relative to the mounting leg 48.

The trough portion 64 connects the upward extending portion 62 to the intermediate portion 60. The upward extending portion 62, intermediate portion 60 and trough portion 64 form a trough 65 for holding bait.

In the illustrated example, the trough portion 64 is a curved portion. However, in other examples, the trough portion 64 need not be curved.

With reference to FIG. 7, in an example, the bend 66 has a radius of curvature that is smaller than the radius of curvature of the trough portion 64, again noting that the trough portion 64 is curved in this example.

Further, in this example, the upward extending portion 62 is generally planar, the intermediate portion 60 is generally planar and the mounting leg 48 is generally planar. The upward extending portion 62 is generally parallel to the mounting leg 48 (e.g. plus or minus 10 degrees and preferably less than plus or minus 5 degrees from parallel).

In the illustrated example, the entirety of the bait rack 36 is formed from a single, continuous piece of sheet material. Preferably, the bait rack 36 is formed from sheet metal such as sheet aluminum or sheet steel. The sheet metal can be formed by bending to define the entirety of the cross-sectional shape (e.g. as illustrated in FIG. 7). The slots 76 and slots 46 discussed herein can be formed by stamping, cutting, milling, laser cutting or other means for removal.

In one example, and as illustrated in FIG. 7, a height H1 between a free edge 70 of the upward extending portion 62 and a bottom 72 of the trough portion 64 is less than a height H2 from a top of the bend 66 and free edge 50 of the mounting leg 48. In one example H1 is between 1.25 and 1.75 inches and in a more particular example approximately 1.5 inches. In one example, H2 is between 1.75 and 2.25 inches and in a more particular example approximately 2 inches.

With reference to FIG. 6, the bait rack 36 includes a plurality of slots 76 through which rodents can access bait stored within trough 65. The bait would be supported on an upper surface 80 of the bait rack 36 and the rodents would access the bait from below through the slots 76.

With reference to one slot 76, but applicable to all of the slots 76 in the current example, the slot 76 includes a first end 82 formed in the upward extending portion 62 and a second end 84 in the intermediate portion 60. The slot 76 extends through the trough portion 64 between the first and second ends 82, 84. Thus, slots 76 provide access to the trough 65 from below the bait rack 36.

While other slot arrangements are contemplated, in this example, the first end 82 of each slot is a same distance from free edge 70 of the upward extending portion 62. Additionally, the second end 84 of each slot is a same distance from bend 66.

With reference to FIG. 2 or 3, the housing body 23 includes first and second sidewalls 86, 88 that extend outward from support wall 38. The housing body 23 also includes laterally spaced apart first and second front walls 90, 92, that are aligned with one another. The support wall 38, sidewalls 86, 88, and front walls 90, 92 generally define the bait chamber 34.

The bait rack 36 is generally located between these walls 38, 86, 88, 90, and 92 when mounted within the housing 22.

Preferably, the bait rack 36 and particularly the trough portion 64 thereof is located vertically above and spaced from floor 94 forming a clearance 96 between the floor 94 and the bottom side of the trough portion 64.

In one example, the height between the floor 94 and the top of the support wall 38 defines a bait chamber height H4 of the bait chamber 34. In an example, a clearance height H3 between the floor 94 and the bottom side of the trough portion 64 is no less than one-third the bait chamber height and preferably at forty percent the bait chamber height. In one example the height H3 is at least 1.25 inches and in a particular embodiment it is approximately 1.5 inches. In one example, the bait chamber height H4 is between about 2.875 and 3.375 inches and in a particular examples is about 3.125 inches.

In one example, the spacing from the floor 94 to free edge 50 of the mounting leg 48 is less than the clearance height.

With reference to FIG. 3, optional bait loading posts 98 can be provided to further secure additional bait within the housing 22. In this example, the bait loading posts 98 extend through slots 76 and have one end secured within mounting cavities 99 provided by the floor 94 of the housing body 22.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A bait station for containing bait comprising:
   a housing, the housing having a housing lid and a housing body, the housing lid and housing body enclosing an interior space and defining at least one opening permitting access to the interior space, the housing body having a support wall defining at least a side of the interior space and extending upward from a floor of the housing body;
   a first mounting rib extending outward from the support wall, the first mounting rib having a leg portion and a foot portion extending from the leg portion, the leg portion extending between the foot portion and the support wall. the foot portion being spaced away from the support wall defining a receiving cavity therebetween;
   a bait holding rack positioned within a bait chamber of the interior space, the bait holding rack comprising:
      a mounting leg having a bottom free edge, at least one mounting slot formed in the mounting leg, the leg portion of the mounting rib being received into the mounting slot, a portion of the mounting leg being received in the receiving cavity and being positioned between the foot portion and the support wall;
      a bait support portion including:
         an intermediate portion connected to the mounting leg by a bent region formed between the mounting leg and the intermediate portion, the intermediate portion extending relative to the mounting leg in a non-parallel and non-perpendicular manner:
         an upward extending portion;
         a trough portion connecting and interposed between the upward extending portion and the intermediate portion, wherein the intermediate portion, trough portion and upward extending portion form a bait holding trough therebetween;
      a plurality of slots providing access to the bait holding trough from a location external of the bait holding trough.

2. The bait station of claim 1, wherein each slot of the plurality of slots has a first end located within the upward extending portion and a second end located within the intermediate portion, the slot extending between the first and second ends through the trough portion.

3. The bait station of claim 1, wherein the mounting leg, intermediate portion, upward extending portion and trough portion are formed from a one-piece, continuous piece of sheet material.

4. The bait station of claim 1, wherein the mounting slot extends from the bottom free edge towards the bent region.

5. The bait station of claim 1, wherein the mounting leg is a generally planar portion, the intermediate portion is a generally planar portion and the upward extending portion is a generally planar portion.

6. The bait station of claim 5, wherein the trough portion is generally curved and a first radius of curvature of the bent region is smaller than a second radius of curvature of the trough portion.

7. The bait station of claim 4, wherein the at least one mounting slot includes a pair of parallel and laterally spaced apart mounting slots, each mounting slot extending from the bottom free edge and intersecting the bottom free edge.

8. The bait station of claim 2, wherein the first ends of the plurality of slots are all located a same distance from an upper free edge of the upward extending portion and the second ends of the plurality of slots are all located a same second distance from the bent region.

9. The bait station of claim 6, wherein the upward extending portion is generally parallel to the mounting leg.

10. The bait station of claim 1, wherein:
    the housing body includes:
       opposed first and second side walls extending outward from the support wall;
       aligned first and second front walls, the first front wall extending from the first sidewall towards the second sidewall and the second front wall extending from the second sidewall towards the first sidewall, the first and second front walls defining the opening permitting access to the bait chamber, the bait chamber generally being defined by the support wall, the first and second side walls and the first and second front walls.

11. The bait station of claim 10, wherein the bait chamber has a bait chamber height defined between the floor and a top of the support wall and clearance is formed between a bottom side of the trough portion and the floor, a clearance height of the clearance between the floor and the bottom side of the trough portion being no less than one-third the bait chamber height.

12. The bait station of claim 11, wherein the clearance height is at least one-half the bait chamber height.

13. The bait station of claim 1, wherein the housing lid is pivotally connected to the housing body proximate the support wall, the housing lid covering the trough formed between the upward extending portion and the intermediate portion.

14. The bait station of claim 1, further comprising a bait loading post extending through one of the plurality of slots, the bait loading post having a free end axially received in a mounting cavity provided by the floor of the housing body.

15. The bait station of claim 1, wherein the bait holding rack rests vertically on a top of the mounting rib.

16. The bait station of claim 1, wherein the at least one mounting slot includes first and second laterally spaced apart mounting slots, each mounting slot extending from the bottom free edge and intersecting the bottom free edge;
  further including a second mounting rib spaced apart from the first mounting rib, the second mounting rib having a leg portion and a foot portion, the leg portion extending between the foot portion and the support wall, the foot portion being spaced away from the support wall defining a second receiving cavity therebetween, the second mounting rib extending into the second mounting slot, a second portion of the mounting leg being received in the second receiving cavity.

17. The bait station of claim 1, wherein the bait holding rack hangs from the support wall and first mounting rib.

18. The bait station of claim 11, wherein the free edge of the mounting leg is spaced a first distance from the floor, the first distance being smaller than the clearance height.

19. The bait station of claim 3, wherein the one-piece, continuous piece of sheet material is free of welds.

20. The bait station of claim 1, wherein the mounting leg, intermediate portion, upward extending portion and trough portion are formed from a one-piece, continuous piece of sheet material.

21. The bait station of claim 20, wherein the one-piece, continuous piece of sheet material is free of welds.

\* \* \* \* \*